(12) United States Patent
Anand et al.

(10) Patent No.: US 7,103,693 B2
(45) Date of Patent: Sep. 5, 2006

(54) METHOD FOR APPLYING INTERRUPT COALESCING TO INCOMING MESSAGES BASED ON MESSAGE LENGTH

(75) Inventors: Vaijayanthimala K. Anand, Austin, TX (US); Janice Marie Girouard, Austin, TX (US); Emily Jane Ratliff, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 201 days.

(21) Appl. No.: 10/955,179

(22) Filed: Sep. 30, 2004

(65) Prior Publication Data

US 2006/0075172 A1   Apr. 6, 2006

(51) Int. Cl.
*G06F 13/24* (2006.01)
*H04L 12/28* (2006.01)

(52) U.S. Cl. ........................... 710/260; 370/910
(58) Field of Classification Search ........ 710/260–269, 710/46–50, 36, 118, 125; 370/389, 428, 370/463, 910, 912; 718/102; 712/244
See application file for complete search history.

(56) References Cited

U.S. PATENT DOCUMENTS

| | | | |
|---|---|---|---|
| 6,351,785 B1 | 2/2002 | Chen et al. | 710/263 |
| 6,529,986 B1 | 3/2003 | Chen et al. | 710/263 |
| 6,574,694 B1 | 6/2003 | Chen et al. | 710/263 |
| 6,988,156 B1* | 1/2006 | Musumeci | 710/260 |
| 2003/0200368 A1* | 10/2003 | Musumeci | 710/260 |
| 2003/0200369 A1* | 10/2003 | Musumeci | 710/260 |
| 2004/0123169 A1* | 6/2004 | Elnozahy et al. | 713/320 |
| 2004/0236875 A1* | 11/2004 | Jinzaki | 710/15 |
| 2005/0226238 A1* | 10/2005 | Hoskote et al. | 370/389 |
| 2006/0064520 A1* | 3/2006 | Anand et al. | 710/52 |
| 2006/0064529 A1* | 3/2006 | Anand et al. | 710/260 |
| 2006/0075172 A1* | 4/2006 | Anand et al. | 710/260 |
| 2006/0075480 A1* | 4/2006 | Noehring et al. | 723/12 |

OTHER PUBLICATIONS

"Multiple token distributed loop local area networks: analysis" by Chalamaiah et al. (abstract only) Publication Date: Dec. 17-20, 1998.*

* cited by examiner

*Primary Examiner*—Gopal C. Ray
(74) *Attorney, Agent, or Firm*—Duke W. Yee; Marilyn Smith Dawkins; James O. Skarsten

(57) ABSTRACT

A balanced approach is provided for interrupt coalescing, wherein interrupts of locking and other small size packets are maximized, while large data segment interrupts are minimized. Thus, the most desirable interrupt characteristics of both large data segments and smaller packets are achieved. Usefully, a data processing system has an adapter connecting the system to a network to receive incoming packets of varying size, the incoming packets respectively carrying messages to interrupt the system processor. Each incoming packet is analyzed, to determine whether or not it meets one or more prespecified criteria, at least a first criterion being related to the size of the incoming packet. The processor is immediately interrupted in accordance with the interrupt message carried by the analyzed packet, if the packet meets all the prespecified criteria. If the analyzed packet does not meet all of the prespecified criteria, the processor is interrupted in accordance with a specified interrupt coalescing technique.

20 Claims, 2 Drawing Sheets

METHOD FOR APPLYING INTERRUPT COALESCING TO INCOMING MESSAGES BASED ON MESSAGE LENGTH

BACKGROUND OF THE INVENTION

1. Technical Field

The invention disclosed and claimed herein generally relates to a method that uses interrupt coalescing selectively, according to the lengths of respective incoming interrupt messages. More particularly, the invention relates to a balanced method of the above type, wherein an interrupt coalescing technique is applied to long interrupt messages received by a data processing network system, whereas the system is interrupted immediately upon receipt of selected short interrupt messages. Even more particularly, the invention relates to a method of the above type wherein one or more criteria are used to determine whether or not a particular message is sufficiently short and important to warrant immediate interruption of the system processor.

2. Description of Related Art

As is known by those of skill in the art, an interrupt is a signal or message that seeks to redirect operation of a processor in a computer system to a task specified by the interrupt. An interrupt may be sent to the system in the form of packets from a file server, a router, a workstation or the like. However, as is further well known, significant processor overhead is required in processing each interrupt. Accordingly, a number of interrupt coalescing techniques have been developed, to reduce the associated overheads. These interrupt coalescing techniques generally delay delivery of a group of packets until a particular event has occurred, such as receipt of a prespecified total number of packets, receipt of a prespecified number of bytes, or expiration of a prespecified time period. The event could also be receipt of a prespecified number of packets, in combination with expiration of a time period.

A switched Ethernet local area network (LAN) is a typical environment for application of the above interrupt coalescing techniques, although use of these techniques is by no means limited to such environment. An Ethernet LAN is generally provided with an adapter, or network interface card (NIC), that receives incoming packets containing interrupt messages. Interrupt coalescing support is typically implemented in an NIC, either by means of specialized hardware time counters, or by firmware delay loops. In interrupt coalescing, the NIC "saves up" or stores a group of pending interrupts, and then delivers them all at the same time to the computer system or other node intended to receive them. Thus, the overhead required in processing each interrupt individually is avoided.

While the interrupt coalescing techniques described above are useful in reducing overhead or consumption of a computer system processor, such techniques result in increased per packet latency. Moreover, such techniques are not typically well suited for use with smaller packets, particularly packets such as locking packets, that carry important interrupt messages. A locking packet generally directs a computer system to receive data that follows the locking packet without delay. Thus, it would be desirable to interrupt the system processor immediately upon receiving packets of this type, and not subject such packets to the delays associated with interrupt coalescing techniques of the type described above.

SUMMARY OF THE INVENTION

The invention provides a balanced approach for the use of interrupt coalescing. More particularly, interrupt coalescing is applied to large data segments, whereas interrupts contained by locking or other small size packets are implemented immediately. Embodiments of the invention thus simultaneously achieve the goal of maximizing locking and other small packet interrupts, while minimizing large data segment interrupts. A useful embodiment is directed to a method for a data processing system having a processor and an adapter connecting the system to receive incoming packets of varying size, wherein the incoming packets respectively carry interrupt messages disposed to interrupt the processor in performing prior assigned tasks. The method includes the step of determining whether or not a particular incoming packet meets one or more prespecified criteria, at least a first criterion being related to the size of the particular incoming packet. The method further comprises immediately interrupting the processor in accordance with the interrupt message carried by the particular packet, if the particular packet meets all the prespecified criteria, and interrupting the processor in accordance with a specified interrupt coalescing technique, if the incoming particular packet does not meet all of the prespecified criteria.

BRIEF DESCRIPTION OF THE DRAWINGS

The novel features believed characteristic of the invention are set forth in the appended claims. The invention itself, however, as well as a preferred mode of use and further objectives and advantages thereof, will best be understood by reference to the following detailed description of an illustrative embodiment when read in conjunction with the accompanying drawings, wherein:

DETAILED DESCRIPTION OF PREFERRED EMBODIMENTS

Figure 1:
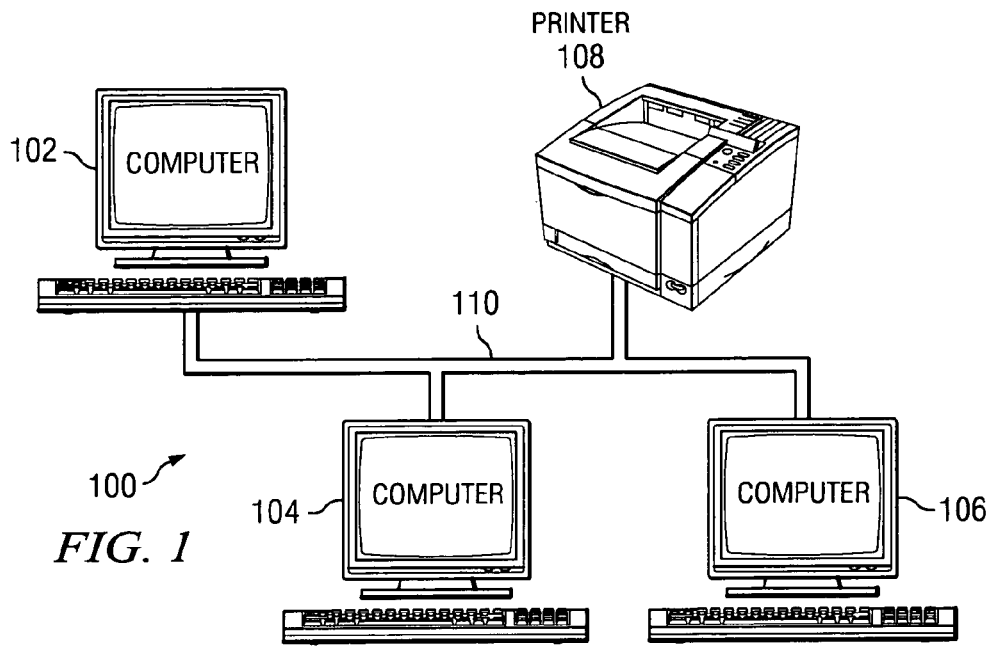
FIG. 1 is a schematic diagram showing a network environment such as an Ethernet LAN for implementing embodiments of the invention.

Referring to FIG. 1, there is shown a simplified Ethernet LAN 100, wherein data processing systems 102–106, such as computers or the like, respectively comprise three of the network nodes. Device 108, such as a printer or the like, comprises a fourth node and respective nodes are interconnected to one other by means of a network transmission path or channel 110. Path 110 comprises an Ethernet transmission medium, such as a conductive cable or a wireless transmission path. Packets of varying length that convey information, including interrupt request message signals, are routed from one node to another by means of transmission path 110. Data processing system 100 is configured to implement an embodiment of the invention, when packets containing interrupt messages are coupled thereto.

Figure 2:
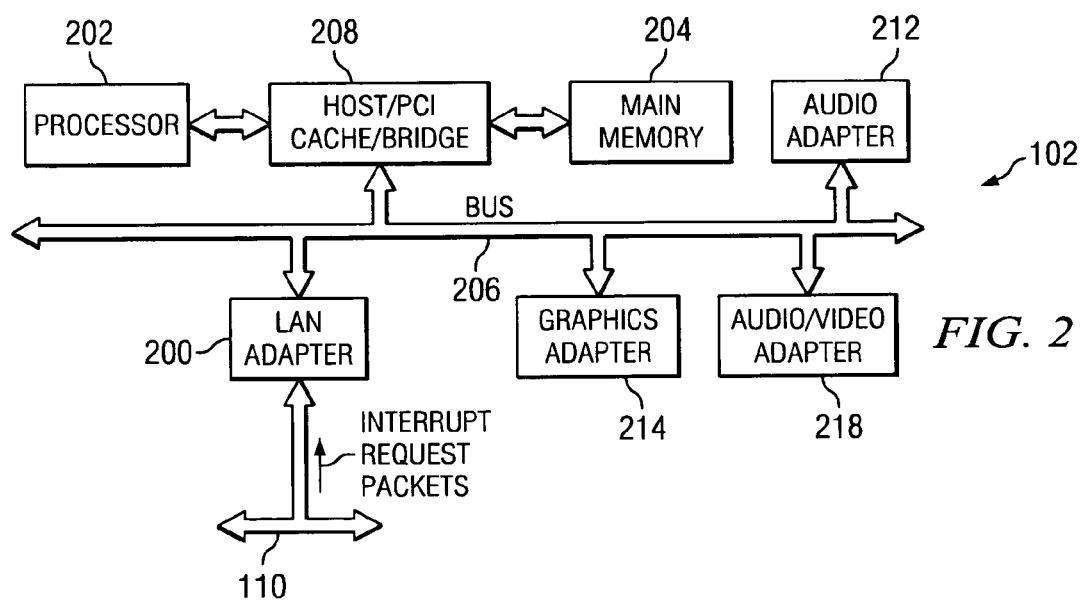
FIG. 2 is a block diagram showing a data processing system included in the network of FIG. 1 that is disposed to receive interrupt request packets.

Referring to FIG. 2, there is shown a simplified block diagram of data processing system 102. System 102 is provided with a LAN adapter 200, comprising a network interface card (NIC) that is connected to receive data and instruction information from, and to transmit information into, the Ethernet transmission path 110. Adapter 200 is configured to implement embodiments of the invention, as described hereinafter. Thus, adapter 200 is disposed to receive incoming external requests to interrupt processor 202 as it is carrying out successive assigned tasks, generally associated with operation of data processing system 102.

Data processing system 102 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In contrast, audio adapter 212, graphics adapter 214, and audio/video adapter 218 are connected to PCI local bus 206 by add-in boards inserted into expansion slots. An operating system runs on processor 202 and is used to coordinate and provide control of various components within data processing system 102 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 102. "Java" is a trademark of Sun Microsystems, Inc. Instructions for the operating system, the object-oriented programming system may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

Figure 3:
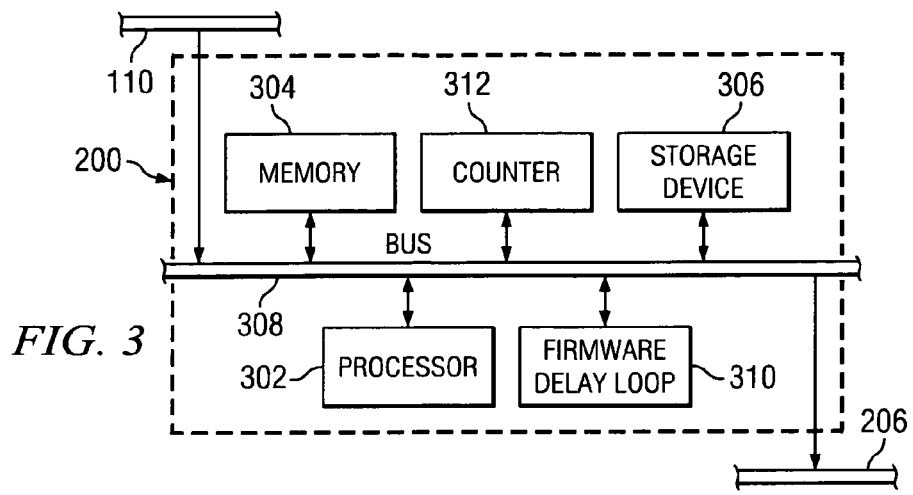
FIG. 3 is a block diagram showing an adapter or NIC for the data processing system of FIG. 2 that is configured to implement embodiments of the invention.

Referring to FIG. 3, there is shown LAN adapter or NIC 200 provided with a processor 302, memory 304 and a storage device 306, respectively connected to a bus 308. Bus 308 is disposed to receive packets that are incoming to data processing system 102 from Ethernet transmission path 110, and is further disposed to provide data and other information to bus 206 of system 102. Thus, adapter 200 receives the interrupt request packets referred to above in connection with FIG. 2. Components 302–306 may be readily configured to collectively interact with one other, in order to implement embodiments of the invention described hereinafter. A firmware delay loop 310, as currently used in conventional interrupt coalescing applications, is also coupled to bus 308. Other conventional NIC components well known to those skilled in the art are not shown in FIG. 3, in order to simplify illustration of embodiments of the invention.

In a first embodiment of the invention, the length of a locking packet, which typically may be on the order of less than 100 bytes, is stored in memory device 304 or otherwise entered into adapter 200. Thereafter, each time an incoming packet containing an interrupt signal is received by adapter 200, respective components thereof cooperatively interact to determine whether the size of the incoming packet is equal to or less than the stored locking packet length. If the size of the incoming packet is equal to or less than such stored length, adapter 200 reads the packet header, to determine whether or not the packet is a broadcast message. If the incoming packet is found not to comprise a broadcast message, the packet is considered to be a locking packet. Thereupon, adapter 200 signals the data processing system 110 to interrupt the processor 202 immediately. As stated above, a locking packet contains a message instructing the data processing system to receive data that immediately follows the locking packet without delay.

It is thus seen that the above embodiment specifies two criteria that must both be met, in order to interrupt the processor immediately, namely (1) the incoming packet size must be no greater than the prespecified size of a known locking packet, and (2) the incoming packet must not be a broadcast message packet. A broadcast packet should not be used to generate an immediate interrupt, since such packets occur frequently on an Ethernet network, and tend to generate false positives in analyzing the comparative urgency of interrupt messages. A further criterion could be that the packet contains a non-zero payload size.

In the above embodiment of the invention, if one or both of the stated criteria are not met, the adapter 200 will process the incoming packet in accordance with an interrupt coalescing technique, whereby the interrupt message of the packet will be delayed. Usefully, adapter 200 implements a conventional coalescing technique of a type described above. In accordance therewith, an interrupt of processor 202 will not occur until (1) a prespecified total number of packets have been received by the adapter; (2) a prespecified total number of bytes have been received; (3) a prespecified time period has expired; or (4) a prespecified number of packets have been received, in combination with expiration of a prespecified time period. The firmware delay loop 310 of adapter 200 could be used in implementing one or the other of these techniques. Alternatively, a time counter (not shown) could be substituted for delay loop 310. It is anticipated that other interrupt coalescing techniques occurring to those of skill in the art could also be used.

In a further embodiment of the invention, packet points Pt are computed as a function of the actual size Sact of a packet containing an interrupt message that is received by adapter 200. If $S_{max}$ and $S_{min}$ are the maximum and the minimum sizes, respectively, of incoming packets that can be received by adapter 200 from transmission path 110, and if $B_v$ is a preselected base value, the packet point value $P_{pt}$ for an incoming packet is computed from the following relationship:

$$P_{pt} = (S_{max} - S_{min} + B_v)/(S_{max} - S_{min}) \qquad \text{Eqn. (1)}$$

In this embodiment of the invention, a packet point criterion value $C_v$ is selected. The criterion value 1.0 has been found to be particularly useful, but other criterion values could be used as well. Each time an interrupt packet is received by adapter 200, adapter 200 computes the point value Ppt therefore, from Equation (1). Adapter 200 then adds the computed value to the cumulative sum of the packet points of all previous interrupt packets received by adapter 200, since the last processor interrupt occurred. FIG. 3 shows a counter 312 that may be used to keep track of this cumulative sum. When the cumulative packet point sum exceeds the criterion value $C_v$, a processor interrupt will occur. The counter 312 will thereupon also be cleared.

To illustrate this embodiment of the invention, base value $B_v$ is selected to be 140, $S_{max}$ is 1500 bytes and $S_{min}$ is 100 bytes. Each of these values is initially entered into adapter

200. Upon receiving a small packet having a size of 100 bytes, adapter 200 computes the packet point value $P_{pt}$ therefore, from Equation (1):

$$P_{pt}=(1500-100+140)/(1500-100)=1.1 \text{ points} \qquad \text{Eqn. (2)}$$

It will be readily apparent that the point value of 1.1 exceeds the criterion point value of point 1.0. Accordingly, the processor 202 of data processing system 102 will be interrupted immediately, upon receipt of the small packet. On the other hand, if a large incoming packet of 1500 bytes is received by adapter 200, the following packet point value will result:

$$P_{pt}=(1500-1500+140)/(1500-100)=0.1 \text{ points} \qquad \text{Eqn. (3)}$$

Thus, when large packets are received, interrupt coalescing occurs so that ten (10) successive large packets will need to be received, in order for the cumulative packet point sum to reach 1.0, and thus generate a processor interrupt.

It is to be understood that the number of packets required to generate a packet interrupt can be selectively varied by varying the base value $B_v$. Reducing the base value increases the number of packets needed to generate an interrupt, as illustrated by the following, wherein the base value is 99:

$$P_{pt}=(1500-1500+99)/(1500-100)=0.07 \text{ points} \qquad \text{Eqn. (4)}$$

If each large packet produces a packet point value of 0.07, fourteen (14) packets must be received by adapter 200 before the processor interrupt is generated. However, a small 100 byte packet will produce 1.07 points, so that the processor will be interrupted immediately, in response thereto.

Increasing the base value decreases the number of packets needed to generate an interrupt, as illustrated by the following, wherein the base value is 650:

$$P_{pt}=(1500-1500+650)/(1500-100)=0.46 \text{ points} \qquad \text{Eqn. (5)}$$

If each large packet produces a point value of 0.46, three (3) packets must be received by adapter 200 before the processor interrupt is generated. A small 100 byte packet will produce 1.4 points, so that the processor will be interrupted immediately upon receiving the small packet.

In further embodiments of the invention, minimum packet size $S_{min}$ could be 64 octets and maximum packet size could be 1518 octets. These sizes include all the frames apart from the preamble. Because of the frame header fields, the CRC and the overhead of the IP and TCP or UDP higher layer protocols, the amount left for useful application data is less then 1518. It is to be emphasized that the above values for $S_{min}$ and $S_{max}$ are representative values only, so that other values can be used for $S_{min}$ and $S_{max}$ as well. One could incorporate only the actual payload values, for example, excluding Ethernet source and destination addresses.

Figure 4:
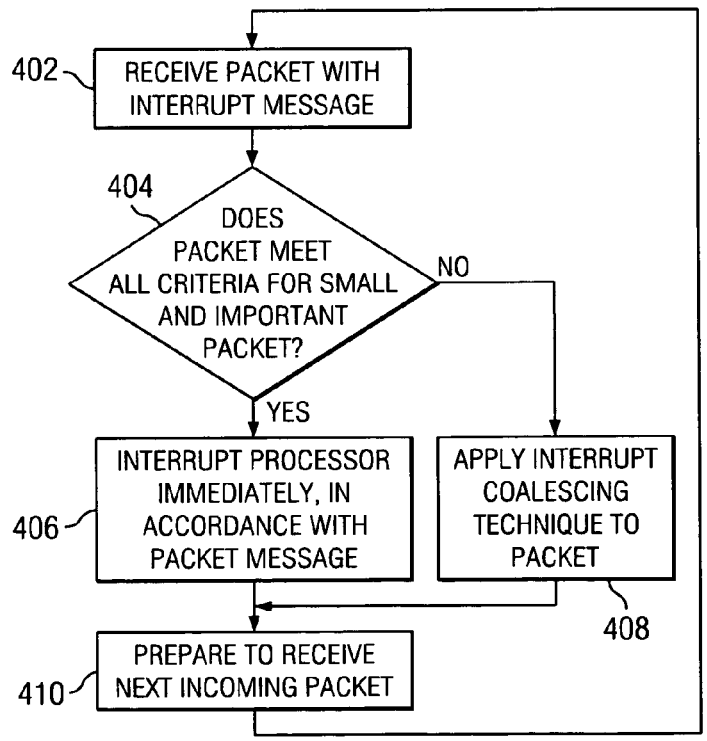
FIG. 4 is a flowchart showing principal steps of an embodiment of the invention.

Referring to FIG. 4, there is shown a flowchart setting forth principal steps of embodiments of the invention. After a packet carrying an interrupt message has been received by the data processing system, as indicated by function block 402, an analysis must be made to determine whether the packet does or does not meet all criteria for a packet that is sufficiently small and significant to warrant an immediate interrupt. This is shown in FIG. 4 by decision block 404. If the packet does meet all criteria, the processor is immediately interrupted, in accordance with the interrupt message carried by the packet, as indicated by function block 406. Otherwise, an interrupt coalescing technique is applied to the packet, as indicated by function block 408. Function block 410 shows that after the event of either block 406 or 408, the system prepares to receive the next incoming packet.

While the above embodiments have been described with an Ethernet LAN network, it is to be understood that embodiments of the invention could readily be used in connection with a token ring network, as well as with other networks known to those of skill in the art.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In a system having a processor for performing assigned tasks and an adapter for connecting the system to a network to receive incoming packets of varying size, wherein said incoming packets respectively carry interrupt messages disposed to interrupt said processor in performing said assigned tasks, a method for operating said system in response to said incoming packets comprising the steps of:

determining whether or not a particular incoming packet meets one or more prespecified criteria, at least a first criterion of said prespecified criteria being related to the size of said particular incoming packet;

immediately interrupting said processor in accordance with the interrupt message carried by said particular packet, if said particular packet meets all of said prespecified criteria; and interrupting said processor in accordance with a specified interrupt coalescing technique, if said incoming particular packet does not meet all of said prespecified criteria.

2. The method of claim 1, wherein:

said particular packet meets said first prespecified criterion if said particular packet has a packet size that does not exceed a prespecified maximum packet size; and said particular packet meets the only remaining criterion of said prespecified criteria if said particular packet does not contain a broadcast message and contained a non-zero payload size.

3. The method of claim 2, wherein:

said prespecified maximum packet size associated with said prespecified criteria is the size of a locking packet.

4. The method of claim 3, wherein:

said locking packet contains a message instructing said network to receive data immediately following said locking packet without delay.

5. The method of claim 1, wherein:

said specified interrupt coalescing technique is selected from a set of interrupt coalescing techniques, said set including techniques that use the total number of packets received, the total number of bytes received, and the expiration of a specified time period, respectively, in determining when to interrupt said processor following receipt of said particular packet.

6. The method of claim 1, wherein said adapter is disposed to receive incoming packets that vary in size between predetermined maximum and minimum packet sizes, and wherein:

said particular packet meets said first criterion if a packet point value, selectively computed from the size of said particular packet and from said maximum and minimum packet sizes, is equal to or greater than a prespecified packet point criterion value.

7. The method of claim 6, wherein:
said computed packet point value is determined by dividing a first quantity by a second quantity, wherein said first quantity comprises the sum of said maximum packet size and a preselected base value, less the size of said particular packet, and said second quantity comprises said maximum packet size less said minimum packet size.

8. The method of claim 7, wherein:
if the packet point value for said particular packet is less than said prespecified packet point criterion value, said packet point value is added to the cumulative sum of packet point values for incoming packets respectively preceding said particular packet since the most recent processor interrupt, the next processor interrupt occurring when said cumulative sum reaches or exceeds said prespecified packet point criterion.

9. The method of claim 8, wherein:
said base value is selectively variable, in order to correspondingly vary the number of successive incoming packets required to generate a processor interrupt.

10. The method of claim 1, wherein:
said network comprises an Ethernet LAN, and said adapter comprises a network interface card.

11. In a data processing system having a processor for performing assigned tasks and an adapter for connecting the system to a network to receive incoming packets of varying size, wherein said incoming packets respectively carry interrupt messages disposed to interrupt said processor in performing said assigned tasks, a computer program product for operating said system in response to said incoming packets comprising:
first instructions for determining whether or not a particular incoming packet meets one or more prespecified criteria, at least a first criterion of said prespecified criteria being related to the size of said particular incoming packet;
second instructions for immediately interrupting said processor in accordance with the interrupt message carried by said particular packet, if said particular packet meets all of said prespecified criteria; and
third instructions for interrupting said processor in accordance with a specified interrupt coalescing technique, if said incoming particular packet does not meet all of said prespecified criteria.

12. The product of claim 11, wherein:
said particular packet meets said first prespecified criterion if said particular packet has a packet size that does not exceed a prespecified maximum packet size; and
said particular packet meets the only remaining criterion of said prespecified criteria if said particular packet does not contain a broadcast message and contains a non-zero payload size.

13. The product of claim 12, wherein:
said specified interrupt coalescing technique is selected from a set of interrupt coalescing techniques, said set including techniques that use the total number of packets received, the total number of bytes received, and the expiration of a specified time period, respectively, in determining when to interrupt said processor following receipt of said particular packet.

14. The product of claim 11, wherein said adapter is disposed to receive incoming packets that vary in size between predetermined maximum and minimum packet sizes, and wherein:
said particular packet meets said first criterion if a packet point value, selectively computed from the size of said particular packet and from said maximum and minimum packet sizes, is equal to or greater than a prespecified packet point criterion value.

15. The product of claim 14, wherein:
said computed packet point value is determined by dividing a first quantity by a second quantity, wherein said first quantity comprises the sum of said maximum packet size and a preselected base value, less the size of said particular packet, and said second quantity comprises said maximum packet size less said minimum packet size; and
if the packet point value for said particular packet is less than said prespecified packet point criterion value, said packet point value is added to the cumulative sum of packet point values for incoming packets respectively preceding said particular packet since the most recent processor interrupt, the next processor interrupt occurring when said cumulative sum reaches or exceeds said prespecified packet point criterion.

16. In a computer system having a processor for performing assigned tasks and an adapter for connecting the system to a network to receive incoming packets of varying size, wherein said incoming packets respectively carry interrupt messages disposed to interrupt said system processor in performing said assigned tasks, said adapter apparatus comprising:
an NIC processor; and
a computer readable medium connected to the NIC processor, said computer readable medium including processor instructions configured to be read by said NIC processor and to thereby cause said NIC processor to:
determine whether or not a particular incoming packet meets one or more prespecified criteria, at least a first criterion of said prespecified criteria being related to the size of said particular incoming packet;
immediately interrupt said system processor in accordance with the interrupt message carried by said particular packet, if said particular packet meets all of said prespecified criteria; and
interrupt said system processor in accordance with a specified interrupt coalescing technique, if said incoming particular packet does not meet all of said prespecified criteria.

17. The apparatus of claim 16, wherein:
said particular packet meets said first prespecified criterion if said particular packet has a packet size that does not exceed a prespecified maximum packet size; and
said particular packet meets the only remaining criterion of said prespecified criteria if said particular packet does not contain a broadcast message and contains a non-zero payload size.

18. The apparatus of claim 17, wherein:
said specified interrupt coalescing technique is selected from a set of interrupt coalescing techniques, said set including techniques that use the total number of packets received, the total number of bytes received, and the expiration of a specified time period, respectively, in determining when to interrupt said processor following receipt of said particular packet.

19. The apparatus of claim 16, wherein said adapter is disposed to receive incoming packets that vary in size between predetermined maximum and minimum packet sizes, and wherein:
said particular packet meets said first criterion if a packet point value, selectively computed from the size of said particular packet and from said maximum and minimum packet sizes, is equal to or greater than a prespecified packet point criterion value.

20. The apparatus of claim 19, wherein:

said computed packet point value is determined by dividing a first quantity by a second quantity, wherein said first quantity comprises the sum of said maximum packet size and a preselected base value, less the size of said particular packet, and said second quantity comprises said maximum packet size less said minimum packet size; and if the packet point value for said particular packet is less than said prespecified packet point criterion value, said packet point value is added to the cumulative sum of packet point values for incoming packets respectively preceding said particular packet since the most recent processor interrupt, the next processor interrupt occurring when said cumulative sum reaches or exceeds said prespecified packet point criterion.

* * * * *